United States Patent
DeLaSalle et al.

(10) Patent No.: US 9,031,766 B2
(45) Date of Patent: May 12, 2015

(54) METHOD FOR CONTROLLING AN ENGINE FOR A MOTOR VEHICLE

(71) Applicant: Ford Global Technologies, LLC, Dearborn, MI (US)

(72) Inventors: Stephen DeLaSalle, Danbury (GB);
Owen Fraser Wood, London (GB);
Peter Douglas Devonport, Wickford (GB); Chris John Kaven, Chelmsford (GB); Richard Andrew Powell, Gravesend (GB)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 13/649,814

(22) Filed: Oct. 11, 2012

(65) Prior Publication Data

US 2013/0096808 A1    Apr. 18, 2013

(30) Foreign Application Priority Data

Oct. 12, 2011  (GB) .................................. 1117581.7

(51) Int. Cl.
*F02D 41/00*  (2006.01)
*F02D 41/02*  (2006.01)
*B60W 10/06*  (2006.01)

(52) U.S. Cl.
CPC .......... *F02D 41/0225* (2013.01); *B60W 10/06* (2013.01); *B60W 2720/106* (2013.01); *F02D 2200/1002* (2013.01); *F02D 2250/26* (2013.01); *B60W 2510/1005* (2013.01); *B60W 2540/10* (2013.01); *B60W 2710/0666* (2013.01)

(58) Field of Classification Search
CPC ........................... F02D 41/0225; B60W 10/06
USPC ................... 701/110, 54, 55, 56; 477/34, 43; 123/492, 493
See application file for complete search history.

(56) References Cited

U.S. PATENT DOCUMENTS

| | | | |
|---|---|---|---|
| 5,225,982 A * | 7/1993 | Ito et al. .......................... | 701/91 |
| 6,021,370 A | 2/2000 | Bellinger et al. | |
| 6,067,495 A * | 5/2000 | Fliearman et al. .............. | 701/55 |
| 6,135,918 A | 10/2000 | Bellinger et al. | |
| 6,368,248 B1 | 4/2002 | Bauer et al. | |
| 6,371,884 B1 | 4/2002 | Channing | |
| 2001/0053731 A1 | 12/2001 | Ibamoto et al. | |
| 2003/0216847 A1 * | 11/2003 | Bellinger ........................ | 701/51 |
| 2005/0261111 A1 | 11/2005 | Kurogo et al. | |
| 2007/0225886 A1 * | 9/2007 | Morris ............................ | 701/51 |
| 2009/0164081 A1 * | 6/2009 | Meloche et al. ................ | 701/94 |
| 2009/0281696 A1 | 11/2009 | Wegeng et al. | |
| 2011/0106388 A1 * | 5/2011 | Boeckenhoff et al. .......... | 701/70 |
| 2011/0307154 A1 * | 12/2011 | Takeda et al. ................... | 701/70 |
| 2013/0173124 A1 * | 7/2013 | Palmer ............................ | 701/55 |

FOREIGN PATENT DOCUMENTS

| | | |
|---|---|---|
| DE | 102010011349 A1 | 11/2010 |
| EP | 1890025 A2 | 2/2008 |
| JP | H0664460 A | 3/1994 |
| JP | 2011149312 A | 8/2011 |
| WO | 2011076373 A1 | 6/2011 |

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

A method for controlling the operation of an engine of a vehicle is disclosed in which a torque request signal supplied to control the supply of torque from the engine is adaptively modified based upon a desired maximum acceleration limit for the currently engaged gear and variations in the sum of forces resisting motion of the vehicle.

20 Claims, 10 Drawing Sheets

METHOD FOR CONTROLLING AN ENGINE FOR A MOTOR VEHICLE

CROSS-REFERENCE TO RELATED APPLICATIONS

This application claims priority to United Kingdom application number 1117581.7 filed on Oct. 12, 2011, the entire contents of which are hereby incorporated herein by reference for all purposes.

BACKGROUND/SUMMARY

This application relates to the control of an engine of a motor vehicle and, in particular, to a method for controlling the operation of such an engine so as to reduce fuel usage. Motor vehicles and, in particular, commercial vehicles operate with a wide range of payloads. The engine of a vehicle is designed to provide adequate performance when the vehicle is fully laden. As a result, the engine will often have an excess of performance when the vehicle is in an unladen condition. Specifically, a powertrain capable of high torque may equate to high acceleration potential when the vehicle is unladen or lightly laden. However, this may result in driving the vehicle inefficiently at a loss to fuel economy.

The inventors have realized that by limiting the accelerative performance of the motor vehicle when the motor vehicle is in a part laden or unladen condition, a significant reduction in fuel usage can be obtained. It is an object of the application to provide a method and system for controlling the engine of a motor vehicle to reduce fuel usage without unduly compromising vehicle performance.

According to a first embodiment, there is provided a method for controlling an engine of a motor vehicle having an engine driven transmission providing a number of gear ratios, wherein the method comprises controlling the engine in response to a torque request, setting an acceleration limit based upon at least a current gear ratio, estimating a current road load for the motor vehicle, and setting a maximum torque request limit based upon the estimated road load and the acceleration limit.

The acceleration limit may be based upon the current gear ratio and the current rotational speed of the engine. Estimating the current road load may comprise determining a current torque output from the engine, determining the acceleration of the motor vehicle due to the current torque output, and using the values of acceleration and torque output to estimate road load.

The method may further comprise reducing the torque request from a demanded torque request to the maximum torque request limit if the demanded torque request exceeds the maximum torque request limit.

The method may further comprise reducing the torque request from the demanded torque request to a modified torque request if the demanded torque request exceeds a torque request limit that is lower than the maximum torque request limit.

The torque request limit may be related to the maximum torque request limit. The torque request limit may be one of a predefined percentage and a predefined fraction of the maximum torque request limit. If the demanded torque request is less than the torque request limit, the torque request to the engine may be the same as the demanded torque request. The demanded torque request may be a torque demand from a driver of the motor vehicle. Alternatively, the demanded torque request may be a torque demand from a cruise control of the motor vehicle.

According to a second embodiment, there is provided a system for controlling the operation of an engine of a motor vehicle having an engine driven transmission providing a number of gear ratios, the system comprising a main electronic processor arranged to receive information regarding the current operating state of the engine and the current operating state of the motor vehicle including current gear ratio and an engine control processor to control the operation of the engine in response to a torque request from the main processor wherein the main processor is operable to set an acceleration limit for the motor vehicle based upon at least the current gear ratio, estimate a current road load for the motor vehicle and set a maximum torque request limit based upon the estimated road load and the acceleration limit.

The main processor may be arranged to receive information regarding the current rotational speed of the engine and the current gear ratio and may be operable to set the acceleration limit for the motor vehicle based upon the current rotational speed of the engine and the current gear ratio.

If a demanded torque request is greater than the maximum torque request limit, the main processor may be operable to reduce the demanded torque request to the maximum torque request limit. The main processor may be further operable to reduce the demanded torque request to a modified torque request if the demanded torque request exceeds a torque request limit that is lower than the maximum torque request limit. The torque request limit may be based upon the maximum torque request limit. The torque request limit may be one of a predefined percentage and a predefined fraction of the maximum torque request limit. If the demanded torque request is less than the torque request limit, the main processor may be operable to supply a torque request to the engine control processor that is the same as the demanded torque request. The demanded torque request may be one of a torque demand from a driver of the motor vehicle and a torque request from a cruise control of the motor vehicle.

DETAILED DESCRIPTION

Figure 1:
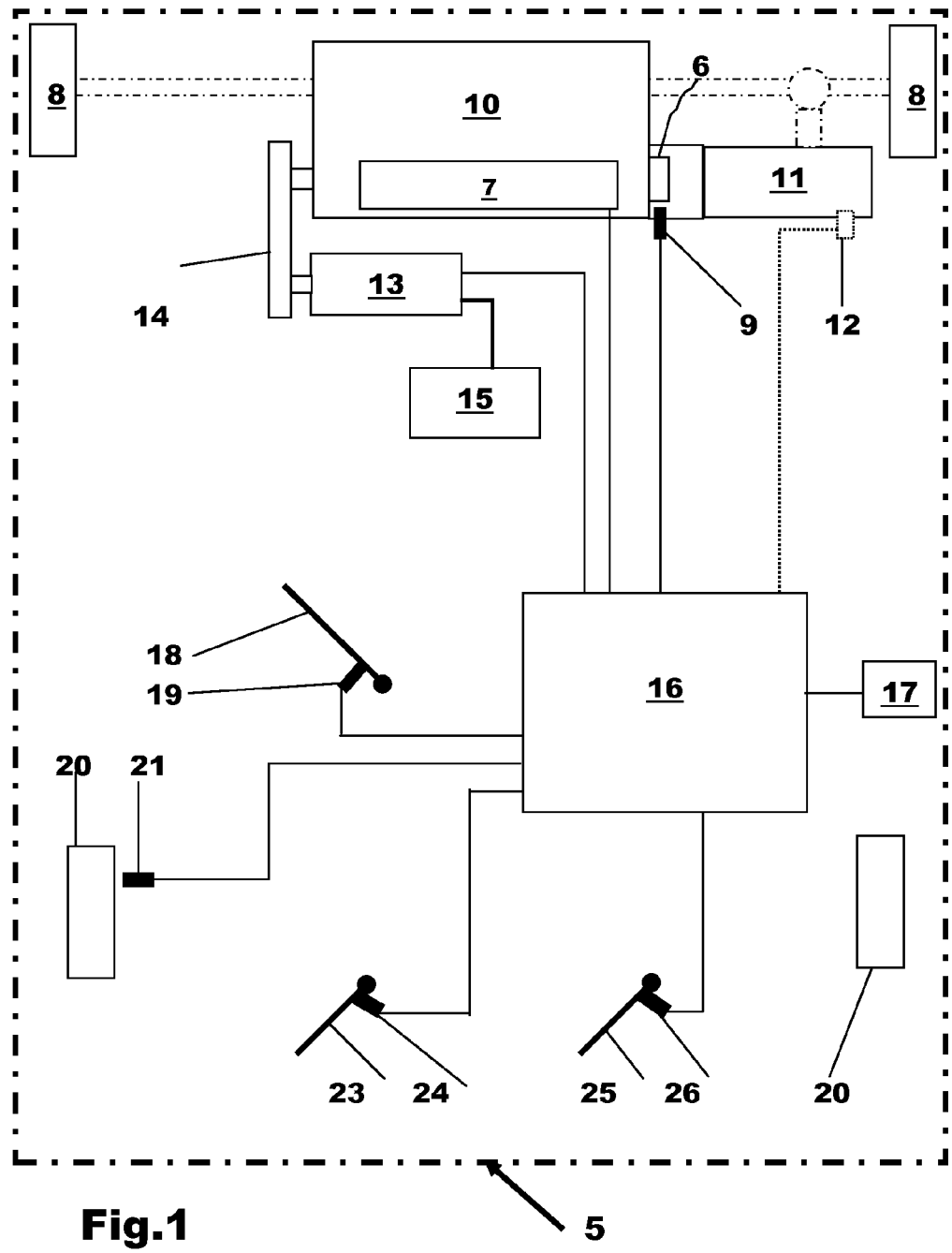
FIG. 1 is a schematic drawing of a motor vehicle having a system for controlling the operation of an engine of the motor vehicle according to the second embodiment.

With particular reference to FIG. 1, there is shown a motor vehicle 5 having an engine 10 driving a transmission 11. The engine 10 can be of any internal or external combustion type but in this case is a diesel engine. The transmission 11 is driveably connected to the engine 10 by a clutch 6 which is manually engaged or released by a driver of the vehicle 5 and has a gear selector (not shown). The gear selector is moveable between several positions including at least one position where a gear forming part of the transmission 11 is selected and a neutral position in which no gears of the transmission 11 are selected. When the gear selector is moved to the neutral position the transmission 11 is said to be in a neutral state in which drive cannot be transmitted by the transmission 11 and when the gear selector is moved to an in gear position the transmission 11 is said to be in an in gear state in which drive can be transmitted by the transmission 11.

An engine starter in the form of an integrated starter-generator 13 is driveably connected to the engine 10 and in this case is connected by a flexible drive in the form of a drive belt or chain drive 14 to a crankshaft of the engine 10. The starter-generator 13 is connected to a source of electrical energy in the form of a battery 15 and is used to start the engine 10 and which is recharged by the starter-generator 13 when it is operating as an electrical generator. The engine is not limited to the use of a starter-generator 13 and the starter-generator 13 could be replaced by a starter motor for starting the engine 10. It will be appreciated that during starting of the engine 10, the starter-generator 13 drives the crankshaft of the engine 10 and that at other times the starter-generator is driven by the engine 10 to generate electrical power.

A driver operable on-off device in the form of a key operable ignition switch (not shown) is used to control the overall operation of the engine 10. That is to say, when the engine 10 is running, the ignition switch is in a 'key-on' position and, when the ignition switch is in a 'key-off' position, the engine 10 is not able to run. The ignition switch also includes a third momentary position used to manually start the engine 10. It will be appreciated that other devices may be used to provide this functionality and that the systems and methods described herein are not limited to the use of an ignition switch.

An electronic control unit 16 is connected to the starter-generator 13, to the engine 10, to an engine speed sensor 9 used to measure the rotational speed of the engine 10, to a brake pedal position sensor 24 used to monitor the position of a brake pedal 23, to a clutch pedal position sensor 26 used to monitor the position of a clutch pedal 25 and to an accelerator position sensor 19 used to monitor the position of an accelerator pedal 18. The accelerator pedal 18 provides a driver input (driver demanded torque) of the required torque output from the engine 10. If the accelerator pedal 18 has been moved from a rest position, it is said to be in a pressed position or in a pressed state and torque will be demanded from the engine 10. In one embodiment, the accelerator position sensor 19 provides a voltage which is converted by signal processing into a percentage of the maximum throttle opening which then is converted into a raw or base torque request.

In this case, the clutch pedal position sensor 26 comprises of a switch which is arranged to give an indication when the clutch pedal 25 is in a clutch engaged position. As an alternative to this arrangement, the actual position of the clutch pedal can be monitored using a sensor such as a rotary potentiometer and the determination of when the clutch is engaged or disengaged can then be performed by the electronic control unit 16 using the signal received from the position sensor.

In this case, the vehicle 5 is a front wheel drive motor vehicle so that a pair of front road wheels 8 is driven by the engine 10 via the transmission 11 and a pair of rear road wheels 20 is undriven. However, it will be appreciated that the vehicle could also be a rear wheel drive motor vehicle or to an all-wheel drive motor vehicle.

The rotational speed of one of the undriven road wheels 20 is measured using a vehicle speed sensor 21 to provide an indication of vehicle speed. In other embodiments the speed of the vehicle 5 could be obtained by other means such as, for example, from a navigation system.

By using data relating to various drive-line components such as the rolling radius of the wheels 20 and gear ratios within the transmission, and in any final drive units, and comparing the measured road speed from the road speed sensor 21 with the engine speed measure by the engine speed sensor 9 when the clutch 6 is sensed to be engaged, a determination can be made of the currently selected gear ratio in the transmission 11.

Alternatively, a selected gear selector sensor 12 (shown in dotted outline on FIG. 1) can be used to monitor whether the transmission 11 is in neutral or in which gear the transmission 11 currently resides. The term 'gear selector sensor' is not limited to a sensor that monitors the position of the gear selector, but rather is any device which can provide a feedback of whether the transmission 11 is in gear or in neutral and, if the transmission 11 is in gear, which gear is currently engaged.

The electronic control unit 16 receives several signals from the engine 10, including a signal indicative of the rotational speed of the engine 10 from the engine speed sensor 9 and outputs one or more control signals to the engine 10 used to control the engine 10. In this case, the engine 10 is a diesel engine and so the primary control is the fuel supply to the engine. The fuel is delivered to the engine 10 by a fuel delivery system 7 under the control of an engine control processor or engine controller 40 (not shown on FIG. 1), formed as part of the electronic control unit 16. In a case where the engine 10 is a spark ignited engine 10, the signals sent from the electronic control unit 16 are used to control not only a fuel supply system but also an ignition system for the engine 10.

The function of the engine control processor is to provide a predetermined torque output from the engine 10 based upon a torque request supplied to it from a main processor 30 (not shown on FIG. 1), forming part of the electronic control unit 16. It will be appreciated that providing such a torque output may also require the control of various other sub-systems (not shown), such as a throttle valve controller or a boost controller (for a turbocharged engine), depending upon the specific configuration of the engine 10.

The electronic control unit 16 comprises of various components, including one or more central processing units, memory devices, timers, and signal processing devices to convert the signals from the sensors connected to the electronic control unit 16 into data which is used by the electronic control unit 16 to control the operation of the engine 10. The electronic control unit 16 is also connected to a human machine interface (HMI) 17, located on a control panel of the vehicle 5 which can be used to display the operating mode of the vehicle 5 and to manually input desired control instructions.

Figure 2:
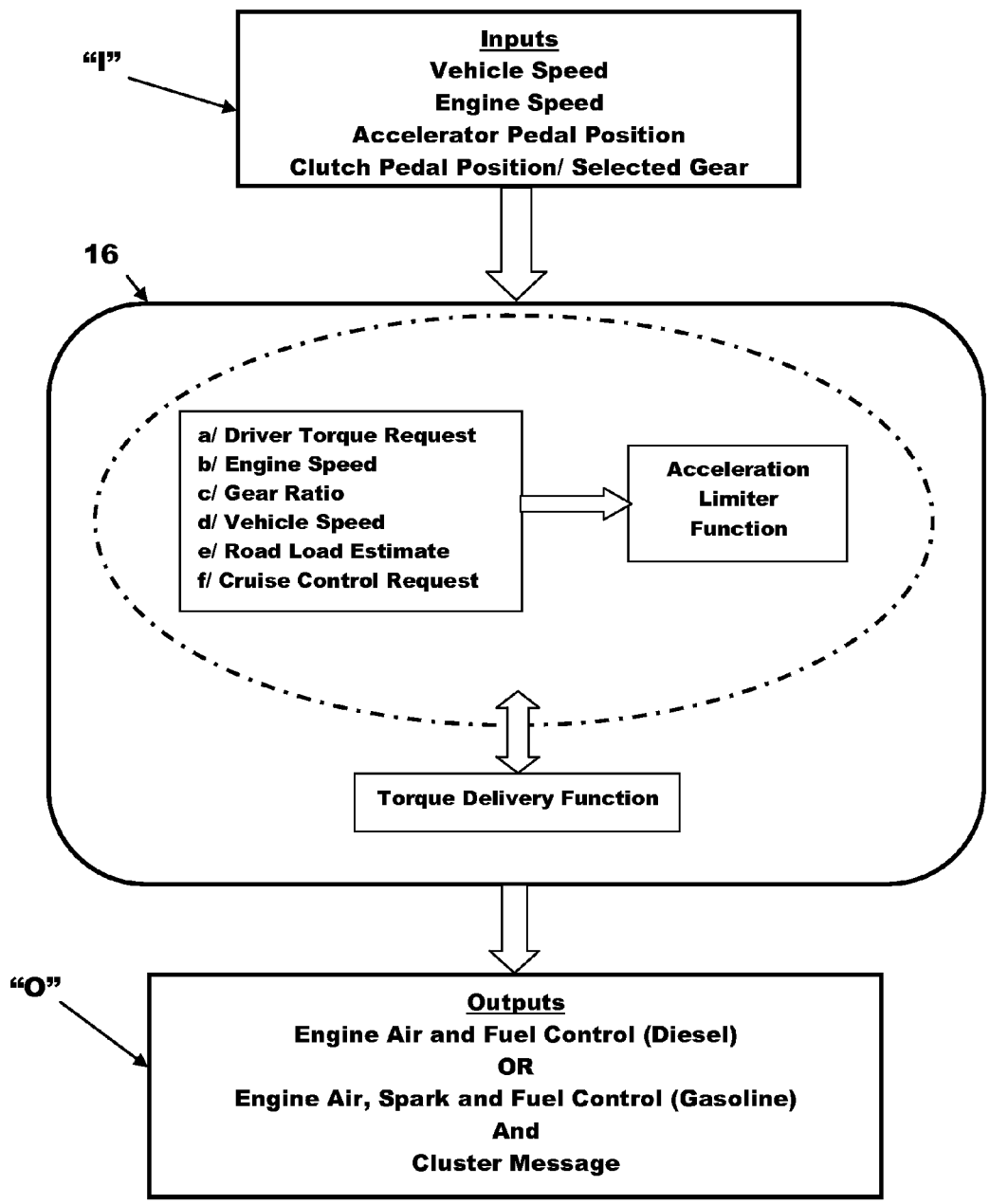
FIG. 2 is a diagrammatic representation of a control system according to the second embodiment.

Referring now to FIG. 2, there is shown in diagrammatic form the inputs and outputs from the electronic control unit 16 shown in FIG. 1. The inputs "I" comprise the vehicle speed from the vehicle speed sensor 21, engine speed from the engine speed sensor 9, accelerator pedal position (which is a percentage of maximum throttle indicative of a driver torque demand) from the accelerator position sensor 19, and an indication of the currently selected gear which can be obtained as previously described. The inputs "I" may also include an input from a cruise control system, if such a system is present on the vehicle 5, such as the state of a driver operable switch or button indicating a desired action such as, for example, cancel; resume; increase; decrease.

The electronic control unit 16 may comprise of a single unit or of a number of separate autonomous electronic processors or control units linked together so as to produce in combination a control means for the engine 10. The electronic control unit 16 uses the information obtained from the inputs "I" to perform various tasks. The main tasks are the generation or production of an acceleration limit (â) based on the currently engaged gear and engine speed and a torque request for use in controlling the torque output from the engine 10. The outputs "O" from the electronic control unit 16 are those necessary to control torque production from the engine 10, such as air and fuel for a diesel engine and air, fuel and spark for a spark ignited engine and, in some cases, a message delivered via the HMI 17 indicating that torque controlling or fuel economising is active.

Figure 3:
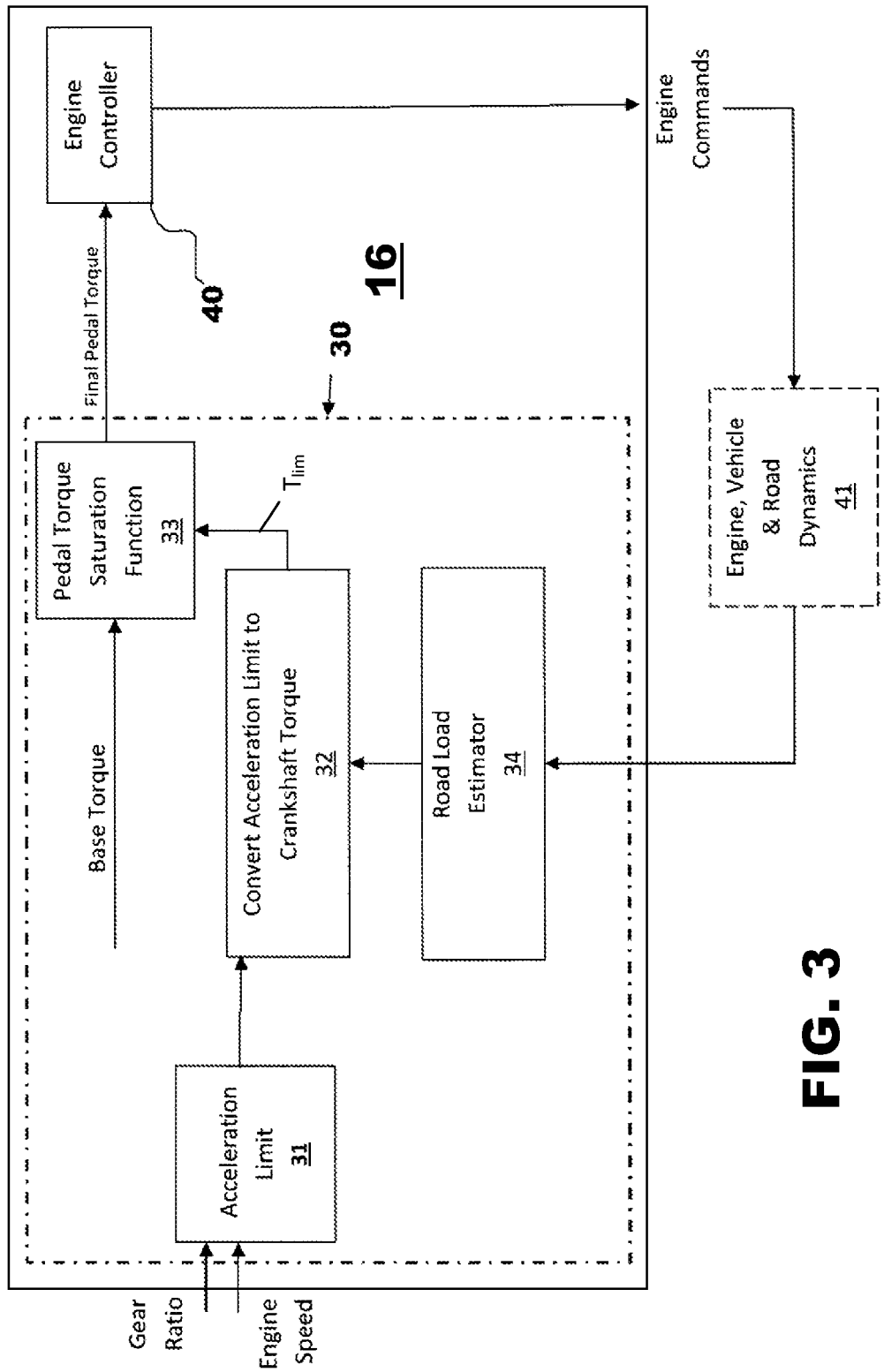
FIG. 3 is a block diagram of a first embodiment of the control system shown in FIG. 1.

Referring now to FIG. 3, there is shown a first embodiment of the electronic control unit 16 in more detail. The electronic control unit 16 in this case comprises of a main processor 30 and an engine control processor or engine controller 40. The engine controller 40 receives the torque request from the main processor 30 and provides the necessary 'Engine Commands' to the engine 10 and, in particular, to the fuel delivery system 7 in order to generate the requested torque from the engine 10. The main processor 30 is shown as having several sub-processors to perform various specific tasks. These may in practice be formed as part of a single processing unit or could be separate autonomous units.

The first of the sub-processors is an acceleration limit processor 31 which is operable to produce the acceleration limit based upon the current speed of the engine 10 and the currently engaged gear. It will be appreciated by those skilled in the art that the acceleration of a motor vehicle is not the same for all of the selectable gears due to the differences in torque ratio produced by the transmission. For example, if a transmission has a first gear ratio of 4.5:1 and a sixth gear ratio of 1:1 then the maximum acceleration attainable in first gear will be approximately 4.5 times greater than can be achieved in sixth gear. In practice the difference will be even greater due to various speed related resistances to motion which increase as the speed of the vehicle increases and the fact that peak torque in first gear will occur at a road speed that is 0.22 of the speed at which peak torque in sixth gear will occur.

It is preferable to vary the acceleration limit (â) for the various selectable gear ratios so that different operating characteristics can be achieved. For example, by rapidly decreasing the acceleration limit (â) with increasing engine speed above a predefined engine speed value, the driver will be encouraged to shift to a higher gear where more acceleration could be permitted. Therefore, although it would be possible to use a single acceleration limit (â) for each selected gear ratio, it is preferable to vary the acceleration limit (â) with engine speed. The various acceleration limits (â) are stored in a look up table form so that, given the current engine speed and engaged gear, a value for the acceleration limit (â) can be retrieved. Table "A" below shows, in a simplified manner, one example of a look up table for a diesel engine showing how the acceleration limit (â) is applied with respect to engine speed for first gear.

TABLE "A"

| Engine Speed RPM | Unlimited Acceleration m/s$^2$ | Maximum Acceleration Limit (â) m/s$^2$ |
|---|---|---|
| 1200 | 2.0 | 2.0 |
| 1500 | 2.75 | 2.15 |
| 2000 | 3.0 | 2.25 |
| 2500 | 2.75 | 2.20 |
| 3000 | 2.0 | 2.0 |

Below 1200 RPM and above 3000 RPM, no limitation of acceleration is applied and so the acceleration of the vehicle 5 will be unaffected below and above these engine speeds. It can be seen that when maximum torque is produced by the engine at 2000 Rpm the reduction of available acceleration is at a maximum being reduced from 3 m/s2 to 2.25 m/s2.

The second sub-processor is a road load estimator 34, the function of which is to provide an output indicative of the current road load acting on the vehicle 5. The road load estimator 34 receives information relating to the current engine, vehicle, and road dynamics, as indicated by the dotted box 41 on FIG. 3. The information received by the road load estimator 34 includes a value for the current torque being produced by the engine 10 which can be obtained from the engine controller 40 and the acceleration of the vehicle 5 produced by this torque which is obtained by differentiating the measured road speed or by some other means such as an acceleration sensor. In practice, the values of acceleration and output torque are filtered values so as to eliminate any high frequency disturbances and provide improved system stability. Using this information, the road load estimator 34 produces an estimate for the current road load (RLest) as described later with reference to FIG. 10.

The value of RLest is supplied to a third sub-processor in the form of a Maximum Torque Request Limit Generator (MTRLG) 32 in which it is combined with the acceleration limit (â) to produce a maximum torque request limit $T_{lim}$, as described later with reference to FIG. 10. The value of $T_{lim}$ is sent from the MTRLG 32 to a pedal torque saturation function processor 33.

The pedal torque saturation function processor 33 receives an input indicative of the torque demand from a driver of the vehicle 5 which could be a direct output from the accelerator position sensor 19 or could be a signal derived from the accelerator position sensor 19 after signal conditioning has taken place. This input is referenced as 'Base Torque' on FIG. 3. The pedal torque saturation function processor 33 uses $T_{lim}$, one or more algorithms to process the torque demand it receives, and outputs a torque request referred to as 'Final Pedal Torque' on FIG. 3 to the engine controller 40. The output torque request is indicative of the torque required to be produced by the engine 10. An example of a typical operating function performed by the pedal torque saturation function processor 33 is shown diagrammatically in FIG. 5.

Figure 5:
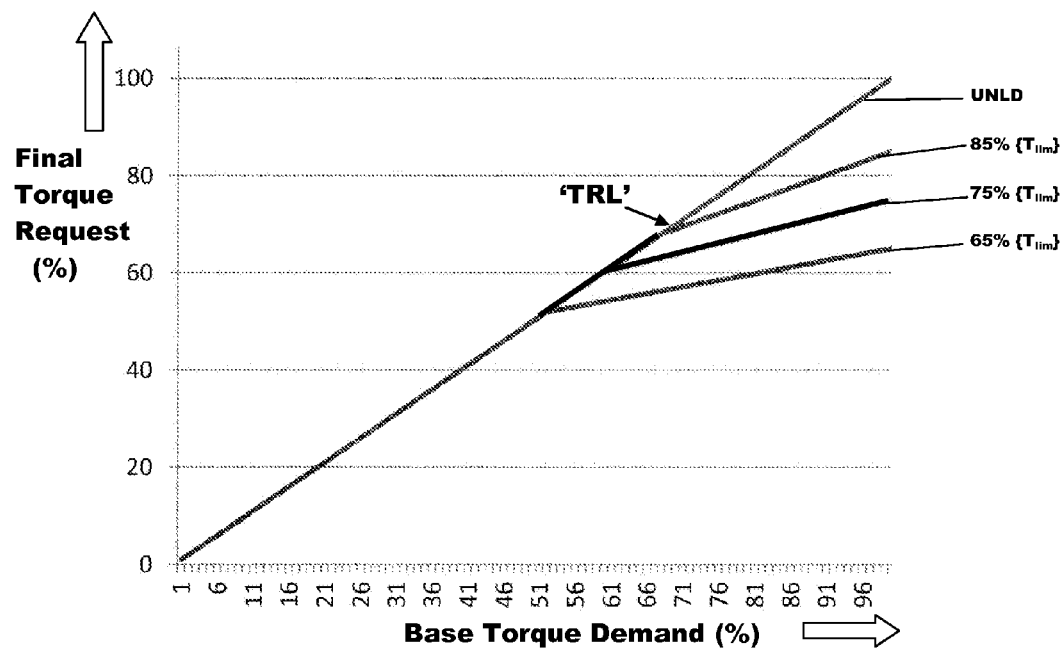
FIG. 5 is a chart showing various relationships between a Torque Demand and a resulting output Torque Request.

FIG. 5 displays an example of a method for controlling the output torque request (torque request) of an engine. Torque request, demanded from a driver, may be reduced from a demanded torque request to a modified torque request based on if the demanded torque request exceeds a TRL. In FIG. 5, the line 'UNLD' represents the case where no processing occurs and so a driver demanded torque (driver requested torque demand, driver torque demand, demanded torque request) is unaltered and will become the 'Final Pedal Torque' or torque request sent to the engine controller 40. The lines 85%, 75% and 65% represent three examples of how torque limitation based upon $T_{lim}$ is applied by the pedal torque saturation function processor 33. The values shown are merely examples and in practice there will be a wide range of values. The values of 85%, 75% and 65% are the values of the maximum torque request limit $T_{lim}$ expressed as a percentage. However, it will be appreciated that the method is not limited to the use of percentage torque values and that the axes could for example be actual torque values for torque demand and torque request rather than percentage values. It will be appreciated that, in practice, the value of $T_{lim}$ will vary based upon variations in the road load (RL) and the acceleration limit (â) in a continuous manner between upper and lower boundaries.

Although it is possible to apply the maximum torque request limit $T_{lim}$ as a single upper limit by, for example, using a test such as:
If $T_{driver} T_{lim}$ Then Use $T_{lim}$ Else Use $T_{driver}$
where, $T_{driver}$ is the driver demanded torque (Base Torque) and $T_{lim}$ is the maximum torque request limit ($T_{lim}$).

However, such a simple approach will produce an unsatisfactory response for the driver. It is desirable that an increase in accelerator pedal position will lead to an increase in vehicle acceleration. It is undesirable to have one or more regions where the vehicle 1 has no response (dead pedal response) to a change in driver demand input via a change in accelerator pedal position. Such 'dead pedal regions' are avoided by using a pedal saturation function (See block 33 on FIGS. 3 and 4 and the relationship shown in FIG. 5), that ensures that driver has to be requesting 100% torque, that is to say the accelerator pedal 18 is on the floor, before the engine 10 is commanded to provide a crankshaft torque which will place the vehicle at the acceleration limit (â). The pedal torque saturation function processor 33 is therefore operable to modify the output torque demand not only when the torque demand exceeds the maximum torque request limit $T_{lim}$, but also when it exceeds a torque request limit (TRL) that is lower than the maximum torque request limit $T_{lim}$.

In the examples shown on FIG. 5, the TRL is set at a predefined percentage of the $T_{lim}$ which in this case is 80% or 0.8 of $T_{lim}$ but some other fraction, percentage or relationship could be used. When the driver demanded torque exceeds the limit TRL, it is modified by reducing it in accordance in this case with a linear relationship. Thus, reducing the driver demanded torque may be based on $T_{lim}$ and $T_{lim}$ may be based on road load, acceleration limit, selected gear, and engine speed. As such, the driver demanded torque may be reduced from a demanded level to a modified level, where the modified level may be output to the engine controller as the torque request. It will, however, be appreciated that the relationship need not be linear. The effect of this is to produce an unaltered relationship between driver demanded torque and torque request from 0% driver demanded torque until the TRL is reached, and then produce a modified or reduced torque output up to the maximum torque request limit $T_{lim}$, which is only reached when the driver torque demand reaches 100%.

During a first condition, when a driver demanded torque is below the TRL, the driver demanded torque may be maintained at the demanded level and output to the engine controller as the torque request. For example, using the 85% $T_{lim}$ as an example, for driver torque demands below 68% (0.8*85), the driver demanded torque and thus, torque request, is unaltered and the driver will receive a feedback indicative of a normal throttle response. However, during a second condition, when the driver demanded torque is above the TRL, the driver demanded torque (demanded torque request) may be reduced from the demanded level to a modified level, which in this case is derived using the following linear relationship:
for every 1% increase in driver demand above TRL, the torque request is increased by (85−(0.8*85))/(100−(0.8*85))= 0.531%. Therefore, if the driver demanded torque is 69% (TRL+1%), the torque request output to the engine controller is (68+(1*0.531)=68.531%. Similarly, if the driver demanded torque is 78%, the output torque request is (68+(10*0.531))= 73.31%. Thus, this modified driver demanded torque and output torque request may reduce torque output through a reduction in throttle response. This reduction in throttle response provides an indication to a driver that there is a need to select a higher gear or that the engine is being pushed very close to its limit and that fuel is therefore being used at a high rate.

The final pedal torque (torque request or modified torque request) is received by the engine controller 40 which adjusts the relevant engine operating parameters, such as air supply (throttle) and fuel, so as to deliver the requested engine torque. The result of the application of this engine torque to the vehicle 5, in terms of the acceleration of the vehicle 5, is monitored and fed back to the road load estimator 34 along with a value of the engine torque being delivered. It will be appreciated that the system cycles continuously through the various processors updating the values of â and $T_{lim}$ and a cycle time of 10 ms may be used. Therefore, in this manner, the maximum torque request limit is adaptively varied based upon the acceleration limit and changes in road load.

It will be appreciated that if the vehicle 5 is heavily laden, there will be no appreciable reduction in performance because the acceleration limit is set to a level higher than that achievable when the vehicle 5 is in such a condition. Similarly, because of the fact that changes in road load ($R_L$) directly affect the magnitude of the maximum torque request limit $T_{lim}$ if the motor vehicle 5 ascends a hill the value of $T_{lim}$ will be increased and for very steep hills the value of $T_{lim}$ may approach or be equal to 100% of driver demanded torque. It will also be appreciated that the value of $T_{lim}$ is affected by the selected gear and that for higher gears the value of $T_{lim}$ may approach or be equal to 100% of demanded torque even if a gradient is not present.

Figure 4:
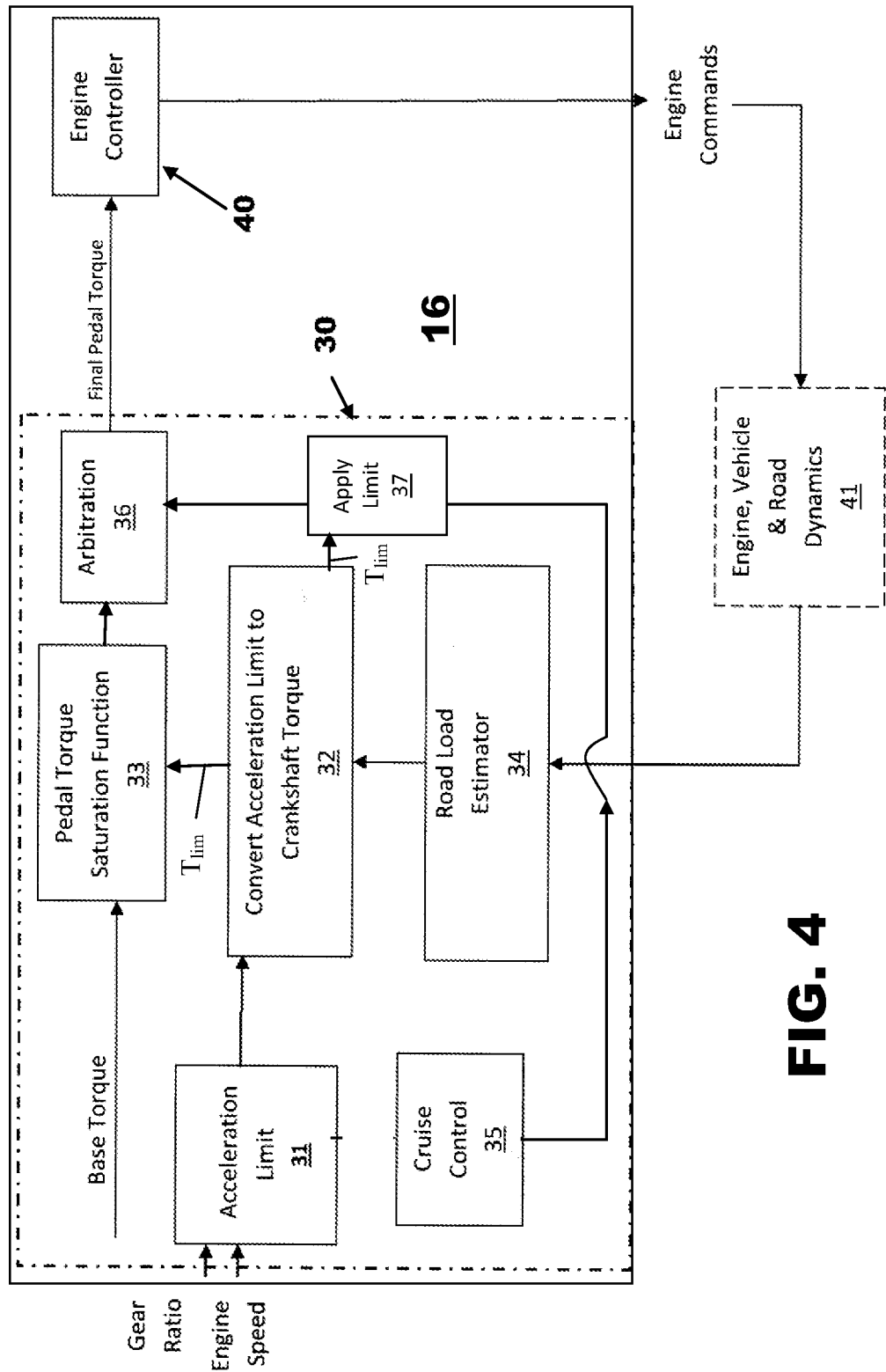
FIG. 4 is a block diagram of a second embodiment of the control system shown in FIG. 1.

Referring now to FIG. 4, there is shown a second embodiment of the electronic control unit 16 shown in FIG. 1. The electronic control unit 16 is in most respects identical to that previously described with respect to FIGS. 3 and 5 and will not be described in detail with respect to the common structure and functioning of this common structure. The primary difference between this second embodiment and the first embodiment is that a torque demand is also potentially produced by a cruise control 35. The cruise control 35 produces a torque demand similar to that produced by the driver operating the accelerator pedal 18, but based on the need to maintain a predetermine speed and/or, in the case of adaptive cruise control, the need to maintain a minimum distance between the vehicle 5 and a vehicle in front of it. It will be appreciated by those skilled in the art that there are various methods for operating cruise controllers and driver demand in parallel and that the control and arbitration in a torque based domain is only one of the possible methods. Other methods may include pedal angle domain, throttle angle domain, acceleration domain, and wheel torque domain. The method is not limited to use with torque based domain arbitration.

The cruise torque demand is supplied to a sub-processor 37 referenced on FIG. 4 as 'Apply limit'. The sub-processor 37 performs exactly the same functions as the Pedal torque saturation function processor 33 with the exception that the input is in this case a cruise control torque demand rather than pedal demand. The function of the sub-processor 37 is to prevent the requesting of acceleration by the cruise control 35 that would exceed the acceleration limit (â). This prevents the vehicle responding more vigorously to changes due to the cruise control 35 than it would to a driver input and also further improves fuel economy. The value of $T_{lim}$ is provided from the MTRLG 32.

Figure 8:
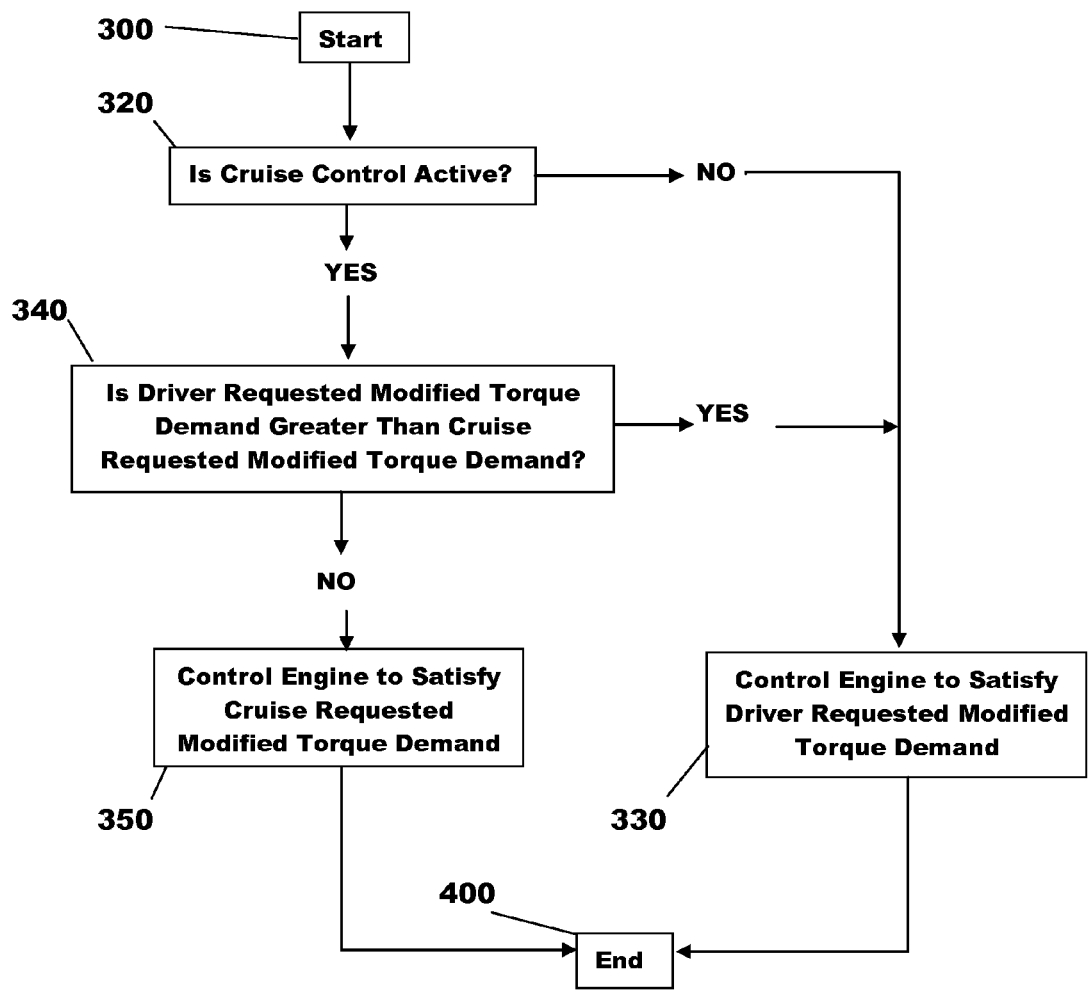
FIG. 8 is a flow chart of an arbitrator routine for use with the methods shown in FIGS. 6 and 7.

The relationship between the cruise control torque demand and the corresponding torque request can be the same as that shown in FIG. 5, or an alternative relationship could be used. In either case, the cruise control based torque request is supplied to an arbitration sub-processor 36 where it is compared with the torque request produced by the pedal torque saturation function sub-processor 33. The logic used in the arbitration sub-processor selects the most appropriate torque request to send to the engine controller 40. FIG. 8, described in more detail later, shows one logical arrangement for arbitrating between a driver demand based torque request and a cruise control demand based torque request.

Figure 9:
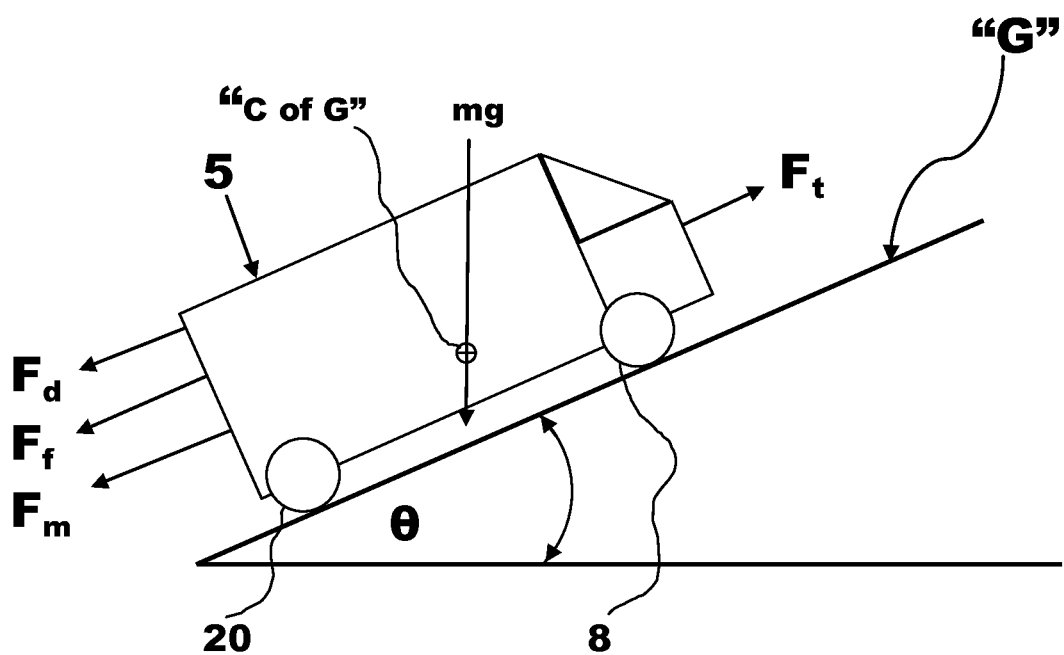
FIG. 9 is a diagrammatic side elevation of the motor vehicle shown in FIG. 1 showing the various forces acting on the motor vehicle.
Figure 10:
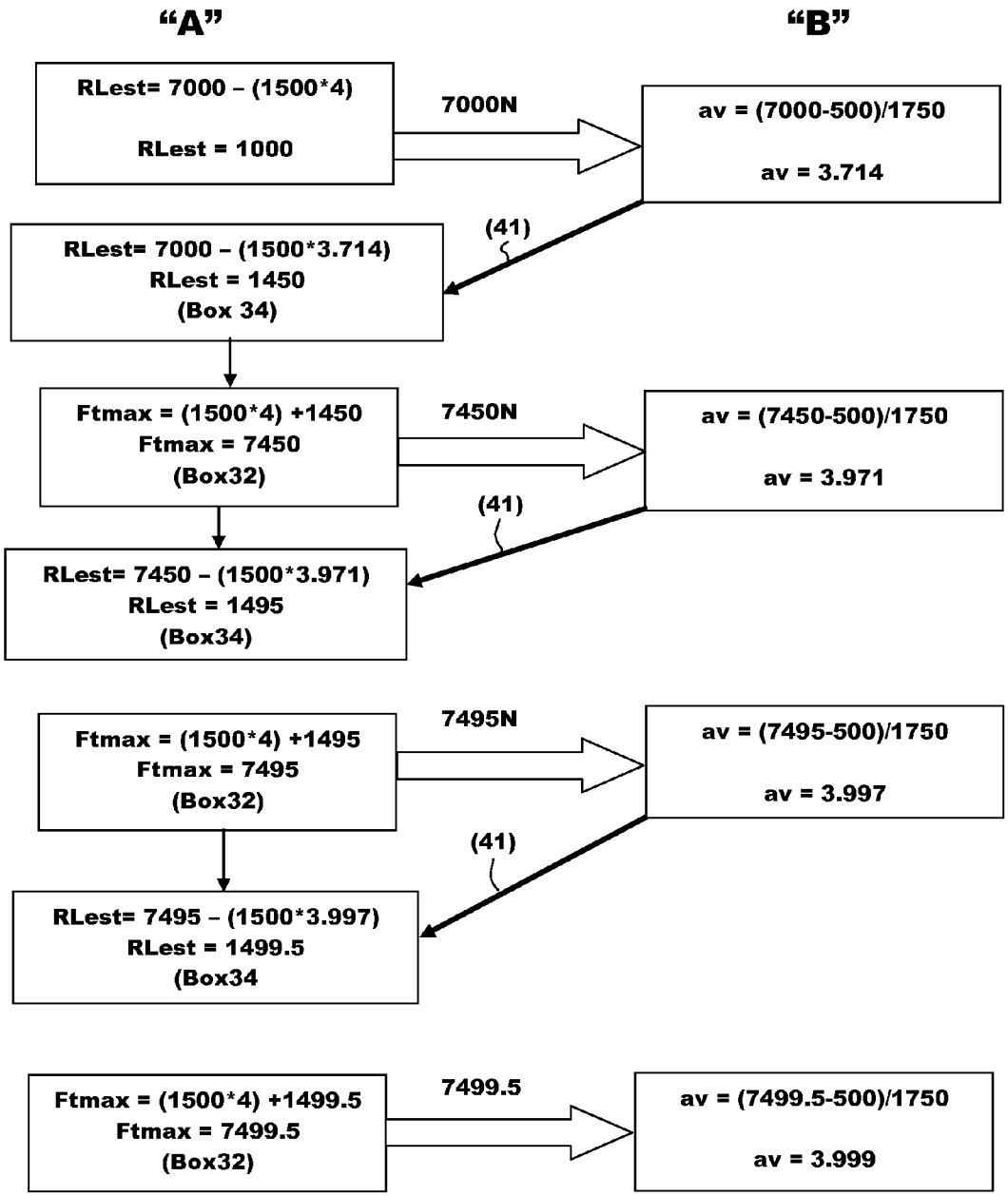
FIG. 10 is a diagram of part of an iterative routine used to determine a maximum torque request limit.

Referring now in particular to FIGS. 9 and 10, various forces act upon the vehicle 5 when it is in motion, which are shown diagrammatically in FIG. 9 where the vehicle 5 is shown climbing a gradient "G" and the center of gravity is indicated by the point "C of G". The forces acting on the vehicle 5 can be summarized as follows: firstly, there is a mass effect ($F_m$) due to gravity; secondly, there is a friction loss ($F_f$) due to friction between the road wheels 8, 20 and the road and friction in the various components between the engine 10 and the road surface; thirdly, there is an aerodynamic loss ($F_d$) due to the interaction of the vehicle 5 with the air through which it is passing; and finally, there is the tractive force ($F_t$) produced by the engine 10.

The following equations can be used to describe the motion of the vehicle 5:

$$F = m*a, \quad (1)$$

where F is the net force acting on the vehicle (N), m is the mass of vehicle (Kg), and a is the acceleration of the vehicle (m/s²). The net force F is equal to:

$$F_t - R_L, \quad (2)$$

where $R_L$ is the sum of all other forces acting on the vehicle 5 and $F_t$ is the force supplied by engine (N). $F_t$ is defined as:

$$F_t = (T_o * G_R)/r, \quad (3)$$

where $T_o$ is engine Output torque (Nm), $G_R$ is the Total Torque ratio between the engine and the road wheel, and r is the nominal rolling radius of the road wheel (m). $R_L$ is defined as:

$$R_L = \text{Road Load} = (F_d + F_f + F_m), \quad (4)$$

where $F_d$ is the aerodynamic drag force (N), $F_f$ is the friction and inertia forces in drive line (N), $F_m$ is the force due to the mass of vehicle=m*g(sin θ), g is the gravitational constant=9.81 m/s², and θ is the angle of gradient that the vehicle is traversing.

Therefore, by replacing the term F in equation (1) with its components from equation (2)

$$F_t - R_L = (m*a) \quad (5)$$

$$R_L = F_t - (m*a) \quad (6)$$

An example of the way in which these equations can be used by the road load estimator 34 and the MTRLG 32 will now be described based upon a vehicle weighing 1750 kg and the application of a force $F_t$ from the engine 10 of 4000 N to the vehicle 5. If the application of the force $F_t$ of 4000N produces an acceleration of 2 m/s² then from equation (6) a value for the road load $R_L$, of 500 N produced.

However, in practice the weight of the vehicle may not be known and so an estimate has to be used which for the purpose of this example is 1500 Kg.

If the acceleration limit (â) is 4 m/s2 by transposing equation (5) we get $$F_{tmax} = (m*a) + R_L \quad (7)$$

Then, using equation (7) the true value of the force that when applied to the vehicle 5 will produce an acceleration of 4 m/s2 is:

$$F_{tmax} = (1750*4) + 500 = 7500N \quad (8)$$

However, this value cannot be directly computed unless the actual mass of the vehicle is known.

To overcome this problem, an iterative technique is used as described hereinafter and shown in FIG. 10. In FIG. 10, the right to left arrows from column "B" to column "A" represent the feedback from the vehicle 5 of the acceleration produced due to the application of a force $F_t$. The boxes in the column marked "A" are actions performed by the road load estimator 34 and the MTRLG 32. The large left to right arrows represent the transfer of the force $F_t$ to the vehicle 5 and the boxes in the column marked "B" show the actual acceleration (av) of the vehicle 5 due to the applied force. Note that the calculations in column "B" are only shown to improve understanding of the process, in practice no calculation is performed and the actual acceleration produced (av) is measured either directly, or by differentiating the vehicle speed obtained from the vehicle speed sensor 21.

Using the estimated mass of the vehicle 1500 Kg and the acceleration limit of 4 m/s², and using the engine derived force of 4000N, then using F=(m*a) we get F=(1500*2)=3000N and by using equation (6): RLest=4000−3000=1000. Note that RLest is an estimate of RL and not an actual value. Then, by applying this result to the calculation of $F_{tmax}$ using equation (7) we get: $F_{tmax}$=1500*4+1000=7000 N.

However, if this force is applied to the vehicle, it will result in an acceleration of only 3.714 m/s² because (7000−500)/1750)=3.714. Where 500 is the actual value of $R_L$, and 1750 is the actual mass of the vehicle. This value of acceleration can then be fed back to produce a new estimate for RLest using equation (6):

$$RLest = 7000 - (1500*3.714) = 1450 \quad (10)$$

Then this can be used to calculate using equation (7) a new estimate for $F_{tmax}$: $F_{tmax}$=(1500*4)+1450=7450N.

The process then continues by measuring the acceleration due to the new applied force and substituting it into the RLest equation and then using the new RLest value to produce an updated value for $F_{tmax}$. This iterative process is shown in FIG. 10 where the references (Box 32), (Box 34) and 41 are the correspondingly referenced items on FIGS. 3 and 4. Note that the value of $F_{tmax}$ converges towards the true value of $F_{tmax}$ calculated in equation (8) above and that the value of acceleration (av) is converging towards the acceleration limit (â). In the few cycles shown in FIG. 10, the values of $F_{tmax}$ and (av) have already obtained values substantially equal to the correct values, and the cycle time between each iterative step could be in the order of 10 to 50 ms. Thus, an accurate value for $F_{tmax}$ is quickly obtained using this approach.

It will be appreciated that the value of $F_{tmax}$ can be converted back into a Limiting value of Torque Request $T_{lim}$ by applying known details regarding the vehicle. These are the total torque ratio between the engine 10 and the driven wheel 8, in combination with the rolling radius of the driven wheel 8. In addition, the value of $T_{lim}$ is automatically compensated for variations in the real road load ($R_L$) because if this varies the value of (av) fed back will change. $T_{lim}$ is therefore automatically compensated for road load variations. This is because, if the road load increases, the value of 'av' will reduce for the same applied engine torque '$T_o$', thereby resulting in an increase in the value of $T_{lim}$. The value of $T_{lim}$ can therefore be said to be related to the acceleration limit (â) and road load ($R_L$).

Figure 6:
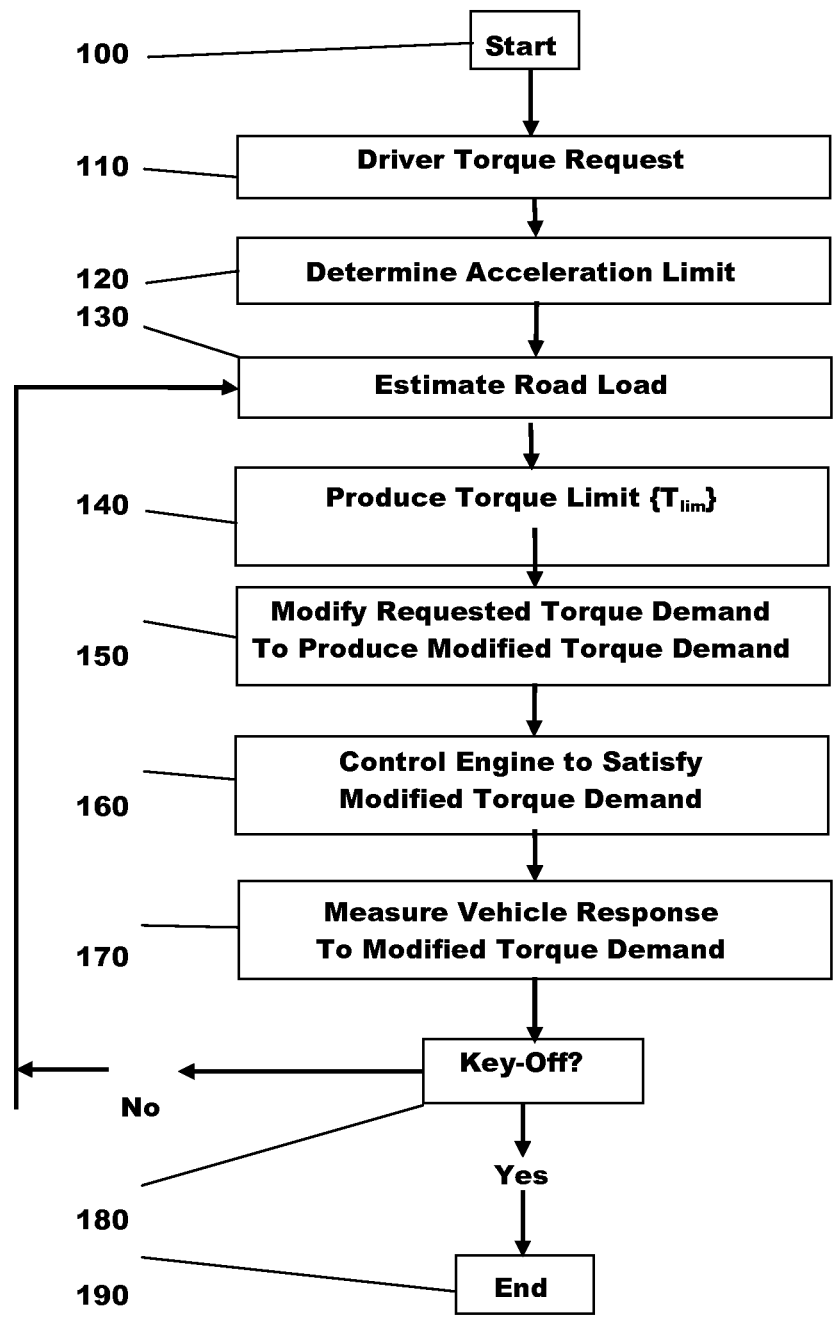
FIG. 6 is a flow chart of a first embodiment of a method for controlling the engine of the motor vehicle shown in FIG. 1 according to the first embodiment.

Referring now to FIG. 6, there is shown the basic steps of a method using the system shown in FIG. 3. The method starts at box 100, where a key-on event occurs. Then, in box 110, a driver torque demand is produced and in box 120 the acceleration limit (â) is determined using current engine speed and current selected gear. Then in box 130, an estimate of the road load RLest is produced based upon feedback of the acceleration of the vehicle 5 for the currently produced engine torque.

In box 140, a maximum torque request limit $T_{lim}$ is set based upon the information generated in boxes 120 and 130. Then, in box 150, the driver torque demand is processed using the maximum torque request limit $T_{lim}$ and one or more algorithms so as to produce a torque request to the engine 10. These algorithms may produce a driver torque demand to torque request relationship of the form shown diagrammatically in FIG. 5. Then, in box 160, the engine 10 is controlled to produce the requested torque and, in box 170, the response of the vehicle 5 to the applied torque is monitored.

Then, in step 180, it is determined whether a key-off event has occurred. If it has, the method ends at box 190. However, if it has not, the method returns to box 130 with information regarding the torque supplied by the engine 10 and the resulting response of the vehicle 5 in terms of the acceleration (av) produced. It will be appreciated that the acceleration limit (â) determined in box 120 is continuously updated based upon changes in engine speed and selected gear.

In this way, limiting torque below a driver torque request (driver demanded torque) happens when torque demand is above a threshold request. This threshold may be the torque request limit (TRL), based on $T_{lim}$. $T_{lim}$, and thus TRL, may be based on road load, grade, and the currently selected gear. As road load increases, $T_{lim}$ may increase. For example, as road grade increases (e.g., a large hill), the road load increases, causing the actual acceleration of the vehicle to decrease at the same engine output torque. Thus, $T_{lim}$ may increase and possibly approach or be equal to 100% of the driver demanded torque as the grade becomes increasingly steep. Thus, the degree of limiting the demanded torque is reduced with higher road load. $T_{lim}$ may also change depending on the selected transmission gear. For example, at higher gears (lower discrete transmission gear ratio), the value of $T_{lim}$ may approach or be equal to 100% of demanded torque, even if a road grade (gradient) is not present. Thus, the degree of limiting torque may be reduced with lower discrete transmission gear ratios. Conversely, at lower gears (higher gear ratios), the degree of limiting torque may be increased.

Figure 7:
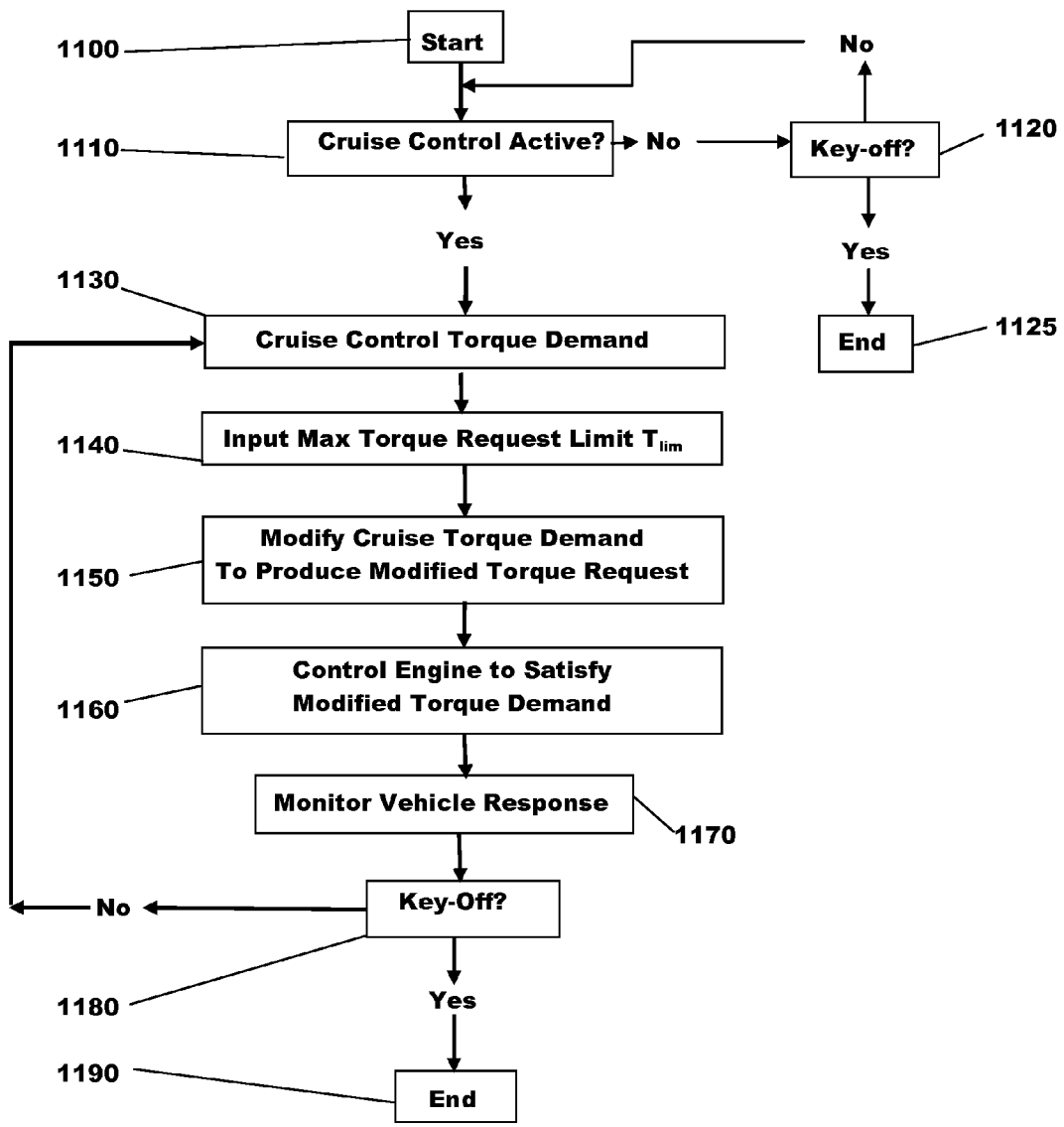
FIG. 7 is a flow chart of a second embodiment of a method for controlling the engine of the motor vehicle shown in FIG. 1 according to the first embodiment.

Referring now to FIG. 7, there is shown the basic steps of a method for use with a cruise control such as the cruise control shown in FIG. 4. The method starts at box 1100, which is a key-on event. Then, in box 1110, it is determined whether cruise control is active. If cruise control is not active, the method cycles through box 1110 continuously through a key-off test indicated by box 1120. If the key-off test is passed, then the method ends at box 1125. If in box 1110 cruise control is determined to be active, then the method advances to box 1130 where a cruise control torque demand is produced by the cruise control system (referenced 35 on FIG. 4). In box 1140, the value of maximum torque request limit $T_{lim}$ is input based upon the information generated in box 140 on FIG. 3, as supplied from box 32 (MTRLG) on FIG. 4 Then in box 1150, the cruise control torque demand is processed using the maximum torque request limit $T_{lim}$ and one or more algorithms, so as to produce a torque request to the engine 10. The processing may be the same as that applied to the driver torque demand referred to in box 150 on FIG. 6, or may be different. The method then advances to box 1160 where the engine 10 is controlled to produce the requested torque and in box 1170 the response of the vehicle 5 to the applied torque is monitored. Then in step 1180, it is determined whether a key-off event has occurred and, if it has, the method ends at box 1190. If it has not, the method returns to box 1130 with refreshed information regarding the torque supplied by the engine 10 and the resulting acceleration response (av) of the vehicle 5.

With reference to FIG. 8, there is shown a basic routine for arbitrating between a driver demand generated driver torque request and a cruise control generated torque request. The routine starts at box 300 and then, in box 320, it is determined whether cruise control is active. If cruise control is not active, the routine advances to box 330 where a driver demand based torque request is used to control torque generation by the engine 10, as per box 160 on FIG. 6, and the method then ends at box 400.

However, if in box 320 cruise control is determined to be active, the routine advances to box 340 where it is determined by arbitration which torque request to use based upon a comparison of a torque request based upon driver demand and a torque request based upon cruise control demand. Note that these torque requests are those that have been produced by the sub-processors 33 and 37, respectively, on FIG. 4. If the driver demand based torque request is greater than the cruise control based torque request, the routine advances to box 330 and then on to box 400. If the driver demand based torque request is less than the cruise control based torque demand, the routine advances to box 350 where the cruise control demand based torque request is used to control torque generation by the engine 10, as per box 1160 on FIG. 7, and the method then ends at box 400.

In one example, the engine of a vehicle may be controlled by a method for limiting torque, based on a driver demanded torque and set torque request limit (TRL). During a first condition, when a driver demanded torque is below a torque request limit, the driver demanded torque may be maintained at a demanded level. This demanded level is then output to the engine controller as the torque request. During a second condition, when the driver demanded torque is above the torque request limit, the driver demanded torque may be reduced from the demanded level to a modified level. The amount of reducing may be based on a maximum torque request limit ($T_{lim}$), based on a road load, acceleration limit, selected gear, and engine speed. The modified level may then be output to the engine controller as a torque request (final torque request).

Therefore, in summary, a vehicle control method and system is provided to effect smart acceleration truncation which constrains or limits actual vehicle performance within a definable acceleration profile. This profile is chosen to encourage drivers to change to higher gears rather than accelerate to higher engine speeds. By controlling operation within an acceleration domain, the system does not affect laden vehicle performance and may produce an improvement in fuel economy, as well as reducing general wear and tear on the vehicle due to excessive acceleration in an unladen condition.

Although the use of a smart acceleration truncation system is particularly suitable for commercial vehicle use, it could also be applied to a passenger vehicle and, in particular, to an SUV or MPV where there is also a significant difference between unladen and laden performance. The use of smart acceleration truncation by way of the application of a torque limit ($T_{lim}$) during acceleration to reduce fuel usage could be permanently enabled or could be engageable by a user of the motor vehicle or by a vehicle dealer or fleet controller. Furthermore, it will be appreciated that smart acceleration truncation may only be active in the lower gears and that no torque restriction may be applied in one or more upper gears such as top gear.

Although the above methods and systems have been described by way of reference to a system in which the mass of the vehicle is not known, it will be appreciated that it could also be applied to a vehicle where the mass of the vehicle is measured using, for example, a ride height sensor. In such a case an iteration technique would not be required to determine the torque request limit $T_{lim}$ it could be directly calculated. However, even if this approach is used the value of road load is still an estimate because it is not actually measured, it is derived by calculation.

It will be appreciated by those skilled in the art that although the subject matter of this disclosure has been described by way of example with reference to one or more embodiments it is not limited to the disclosed embodiments and that alternative embodiments could be constructed without departing from the scope of the disclosure as defined by the appended claims.

The invention claimed is:

1. A method for controlling an engine of a motor vehicle having an engine driven transmission providing a number of gear ratios, comprising:
controlling the engine in response to a torque request;
setting an acceleration limit based upon at least a current gear ratio;
estimating a current road load for the motor vehicle;
setting a maximum torque request limit based upon the estimated road load and the acceleration limit;
reducing the torque request from a demanded torque request to the maximum torque request limit if the demanded torque request exceeds the maximum torque request limit; and
reducing the torque request from the demanded torque request to a modified torque request if the demanded torque request exceeds a torque request limit that is lower than the maximum torque request limit.

2. The method as claimed in claim 1, wherein the acceleration limit is based upon the current gear ratio and a current rotational speed of the engine and wherein the modified torque request is less than the maximum torque request limit if the demanded torque request is less than the maximum torque request limit.

3. The method as claimed in claim 1, wherein estimating the current road load comprises determining a current torque output from the engine, determining the acceleration of the motor vehicle due to the current torque output and using the values of acceleration and torque output to estimate road load.

4. The method as claimed in claim 1, wherein the demanded torque request includes a first driver demanded torque request produced by an accelerator pedal and a second cruise demanded torque request produced by a cruise control and wherein the modified torque request includes a first driver requested modified torque request reduced from the first driver demanded torque request and a second cruise requested modified torque request reduced from the second cruise demanded torque request.

5. The method as claimed in claim 4, further comprising selecting one of the first driver requested modified torque request and the second cruise requested modified torque request and controlling the engine in response to the selected modified torque request, where the selecting is based on which of the first driver requested modified torque request and the second cruise requested modified torque request is greater.

6. The method as claimed in claim 1, wherein the torque request limit is related to the maximum torque request limit and wherein the modified torque request is based on a relationship between the demanded torque request, the torque request limit, and the modified torque request, where the modified torque request only reaches the maximum torque request limit when the demanded torque request reaches 100 %.

7. The method as claimed in claim 6 wherein the torque request limit is one of a predefined percentage and a predefined fraction of the maximum torque request limit and wherein the relationship that the modified torque request is based on is a linear relationship where the modified torque request increases from the torque request limit up to the maximum torque request limit.

8. The method as claimed in claim 1, wherein if the demanded torque request is less than the torque request limit, the torque request to the engine is the same as the demanded torque request.

9. The method as claimed in claim 1, wherein the demanded torque request is a torque demand from a driver of the motor vehicle.

10. The method as claimed in claim 1, wherein the demanded torque request is a torque demand from a cruise control of the motor vehicle.

11. A system for controlling operation of an engine of a motor vehicle having an engine driven transmission providing a number of gear ratios, the system comprising:
a main processor arranged to receive information regarding a current operating state of the engine and the current operating state of the motor vehicle, including current gear ratio and;
an engine control processor to control the operation of the engine in response to a torque request from the main processor, wherein the main processor is operable to set an acceleration limit for the motor vehicle based upon at least the current gear ratio, estimate a current road load for the motor vehicle, and set a maximum torque request limit based upon the estimated road load and the acceleration limit and, if a demanded torque request is greater than the maximum torque request limit, the main processor is operable to reduce the demanded torque request to the maximum torque request limit and the main processor is further operable to reduce the demanded torque request to a modified torque request if the demanded torque request exceeds a torque request limit that is lower than the maximum torque request limit.

12. The system as claimed in claim 11, wherein the main processor is arranged to receive information regarding a current rotational speed of the engine and the current gear ratio, and is operable to set the acceleration limit for the motor vehicle based upon the current rotational speed of the engine and the current gear ratio and wherein the modified torque request is lower than the maximum torque request limit.

13. The system as claimed in claim 11, in which the system includes a means for determining acceleration of the motor vehicle and the main processor is operable to use the torque request supplied to the engine control processor to estimate a current torque output from the engine, determine the acceleration of the motor vehicle in response to the torque output, and use the acceleration and torque output to estimate the current road load.

14. The system as claimed in claim 11, wherein the demanded torque request includes a first torque demand from a driver of the motor vehicle and a second torque request from a cruise control of the motor vehicle and wherein the main processor is further operable to determine a first driver requested modified torque request if the first torque demand exceeds the torque request limit and determine a second cruise requested modified torque request if the second torque request exceeds the torque request limit.

15. The system as claimed in claim 14, wherein the main processor is further operable to compare and select the larger of the first driver requested modified torque request and the second cruise requested modified torque request to determine a final torque request for engine control and wherein the engine control processor is further operable to control operation of the engine in response to the final torque request from the main processor.

16. The system as claimed in claim 11, wherein the torque request limit is based upon the maximum torque request limit and wherein the torque request limit is a predefined amount less than the maximum torque request limit, the predefined amount defined such that the modified torque request reaches the maximum torque request limit only when the demanded torque request is 100%.

17. The system as claimed in claim 11, wherein the torque request limit is one of a predefined percentage and a predefined fraction of the maximum torque request limit.

18. The system as claimed claim 11, wherein if the demanded torque request is less than the torque request limit, the main processor is operable to supply the torque request to the engine control processor that is the same as the demanded torque request.

19. The system as claimed in claim 11, wherein the demanded torque request is one of a torque demand from a driver of the motor vehicle and a torque request from a cruise control of the motor vehicle.

20. A method, comprising:
limiting torque to a first level below that requested when above a maximum threshold request, where the maximum threshold increases with increasing road load, and a degree of limiting is reduced with higher road load and increased with higher discrete transmission gear ratios; and
limiting torque to a second level below that requested and the first level when above a second threshold request, the second threshold less than the maximum threshold.

* * * * *